(12) United States Patent
He et al.

(10) Patent No.: US 8,531,643 B2
(45) Date of Patent: Sep. 10, 2013

(54) LIQUID CRYSTAL PANEL AND COLOR FILTER SUBSTRATE THEREOF

(75) Inventors: Chengming He, Shenzhen (CN); Kuancheng Lee, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 278 days.

(21) Appl. No.: 13/000,896

(22) PCT Filed: Oct. 11, 2010

(86) PCT No.: PCT/CN2010/077659
§ 371 (c)(1),
(2), (4) Date: Dec. 22, 2010

(87) PCT Pub. No.: WO2012/031415
PCT Pub. Date: Mar. 15, 2012

(65) Prior Publication Data
US 2012/0057109 A1 Mar. 8, 2012

(30) Foreign Application Priority Data
Sep. 8, 2010 (CN) .......................... 2010 1 0283854

(51) Int. Cl.
*G02F 1/1339* (2006.01)
*G02F 1/1333* (2006.01)

(52) U.S. Cl.
USPC ............................. 349/155; 349/110; 349/153

(58) Field of Classification Search
USPC .......................... 349/153–156, 110
See application file for complete search history.

(56) References Cited

U.S. PATENT DOCUMENTS

| 6,163,357 | A * | 12/2000 | Nakamura | 349/155 |
| 7,259,811 | B2 | 8/2007 | Kim | |
| 2002/0171800 | A1* | 11/2002 | Miyazaki et al. | 349/156 |
| 2003/0025868 | A1* | 2/2003 | Hiroshima et al. | 349/156 |
| 2003/0112405 | A1* | 6/2003 | Kim et al. | 349/156 |
| 2007/0165179 | A1 | 7/2007 | Jang | |

FOREIGN PATENT DOCUMENTS

| CN | 1556421 A | 12/2004 |
| CN | 1940646 A | 4/2007 |
| CN | 101029944 A | 9/2007 |
| KR | 20080024337 A | 3/2008 |

\* cited by examiner

*Primary Examiner* — Dung Nguyen
(74) *Attorney, Agent, or Firm* — Sughrue Mion, PLLC

(57) ABSTRACT

The present invention provides a liquid crystal panel and a color filter substrate thereof. The color filter substrate includes a substrate, a plurality of color filtering units, a display-area black matrix, an edge black matrix, and the color filtering units; the display-area black matrix, the edge black matrix and a transparent conductive layer are formed on the substrate in turn; the edge black matrix surrounds a display area of a liquid crystal panel and then forms an edge light-shielding area corresponding to a periphery of the display area, and the color filter substrate further has a plurality of photo spacers formed on the transparent conductive layer, arranged on the periphery of the display area, and are extended into the edge light-shielding area formed by the edge black matrix; and each of the photo spacers is separated from the adjacent photo spacer at a distance to form a slit therebetween, liquid crystal material in the display area flows through the slit to the edge light-shielding area by capillarity, so as to prevent liquid bubbles from being formed at the edges of the display area and to enhance production yield of the liquid crystal panel.

20 Claims, 6 Drawing Sheets

LIQUID CRYSTAL PANEL AND COLOR FILTER SUBSTRATE THEREOF

FIELD OF THE INVENTION

The present invention relates to a liquid crystal panel, and more particularly to a liquid crystal panel and a color filter substrate thereof that prevents the phenomenon of liquid bubbles from occurring at the edge of a display area during a manufacturing process thereof.

BACKGROUND OF THE INVENTION

With reference to FIG. 1, FIG. 1 discloses a partially cross-sectional side view of a liquid crystal panel in the conventional technology. A conventional liquid crystal panel 900 mainly has a thin-film-transistor (TFT) substrate 91, a color filter 92, a top substrate 93 and a liquid crystal layer 94. The thin-film-transistor substrate 91 has a pixel electrode layer 911 and an alignment film 912. The color filter 92 has a plurality of color filtering units 921R and a plurality of black-matrix layers 922, and may be formed on a bottom surface of the top substrate 93 or directly formed on the thin-film-transistor substrate 91 by a color-filter-on-array (COA) technology. The color filter 92 further includes a protection layer 923, a transparent conductive layer 924 (ITO) and an alignment film 925. The liquid crystal layer 94 is disposed between the thin-film-transistor substrate 91 and the color filter 92 and has liquid crystal material. During assembling the thin-film-transistor substrate 91 to the color filter 92 and the top substrate 93, a plurality of spacers 95 are disposed therebetween for supporting, so as to maintain a certain cell gap to control thickness of the liquid crystal material. The spacers 95 is disposed in the space of the liquid crystal layer 94 in advance or correspondingly disposed on corresponding positions of the black matrix layers 922 between the color filtering units. Besides, the thin-film-transistor substrate 91 and the top substrate 93 both have a sealing member 96 at edges thereof for sealing the liquid crystal material of the liquid crystal layer 94.

In a manufacturing process of large-sized liquid crystal panel, the liquid crystal layer 94 is easy to have edge bubbles 97 formed at an edged-black-matrix area B around a display area A of the liquid crystal panel 900 due to insufficient diffusion of the liquid crystal material during injection. When the bubble 97 is wider than the edged-black-matrix area B and extends to corresponding positions of the color filtering units 921R in the display area A, a finished product will have defects on the display area A and becomes a defective product, and leads to low production yield. If the color filter 92 is directly formed on the thin-film-transistor substrate 91 through the COA technology, a surface of the thin-film-transistor substrate 91 becomes uneven, so that condition of insufficient diffusion of the liquid crystal material and defects caused by the bubbles 97 will become worse due to the uneven surface of the thin-film-transistor substrate 91 and thereby cause the production yield of using COA technology difficult to be increased.

Hence, it is necessary to provide a liquid crystal panel and a color filter substrate thereof to overcome the problems existing in the conventional technology.

SUMMARY OF THE INVENTION

A primary object of the invention is to provide a color filter substrate that slits formed by photo spacers thereof can help liquid crystal material of a liquid crystal layer to diffuse and flow to the edge, and effectively prevent the liquid crystal material from forming bubbles at the edge of the substrates.

A secondary object of the present invention is to provide a liquid crystal panel which uses shape and arrangement of photo spacers thereof to effectively reduce the risk that the liquid crystal material forms bubbles at the edges of a display area of the liquid crystal panel during injection.

To achieve the above object, the present invention provides a color filter substrate having a substrate, a plurality of color filtering units, a display-area black matrix, an edge black matrix, wherein the color filtering units, the display-area black matrix, the edge black matrix and a transparent conductive layer are formed on the substrate in turn, and the edge black matrix surrounds a display area of a liquid crystal panel and then forms an edge light-shielding area corresponding to a periphery of the display area, wherein the color filter substrate further has a plurality of photo spacers formed on the transparent conductive layer, arranged on the periphery of the display area, and extends into the edge light-shielding area formed by the edge black matrix, each of the photo spacers is separated from the adjacent photo spacer at a distance to form a slit therebetween, liquid crystal material in the display area flows through the slit to the edge light-shielding area by capillarity.

In one embodiment of the present invention, the display-area black matrix is connected to the edge black matrix along an extension direction, and the photo spacers are extended to the edge light-shielding area along the extension direction of the display-area black matrix relative to the edge black matrix.

In one embodiment of the present invention, each of the photo spacers is in a strip shape.

In one embodiment of the present invention, each of the photo spacers has a plurality of longer sections and a plurality of shorter sections, and the longer sections and the shorter sections are arranged alternately at intervals in a strip shape.

In one embodiment of the present invention, each of the photo spacers has a plurality of sections with identical length, wherein the sections are arranged at intervals in a strip shape.

In one embodiment of the present invention, each of the photo spacers has a length disposed in the display area that is smaller than or equal to 30 mm, and has another length disposed in the edge light-shielding area that is smaller than or equal to 20 mm.

Moreover, the present invention further provides a liquid crystal panel, characterized in that: the liquid crystal panel has:

a display area;

a liquid crystal layer having liquid crystal material and disposed in a range of the display area;

an edge black matrix surrounding the display area and forming an edge light-shielding area corresponding to a periphery of the display area; and a plurality of photo spacers disposed at the periphery of the display area and extended to the edge light-shielding area which is formed at the periphery of the display area by the edge black matrix, wherein each of the photo spacers is separated from the adjacent photo spacer at a distance to form a slit therebetween, and the liquid crystal material of the liquid crystal layer flows through the slit to the edge light-shielding area by capillarity.

In one embodiment of the present invention, the liquid crystal panel has a first substrate, a second substrate and a sealing member; the second substrate and the first substrate are disposed opposite to each other; the sealing member surrounds the display area and bonds the first substrate and the second substrate; the liquid crystal layer is disposed between the first substrate, the second substrate and the sealing member; the photo spacers are disposed between the first substrate and the second substrate.

In one embodiment of the present invention, the second substrate is a thin-film-transistor substrate; the liquid crystal panel has a color filter, the color filter and the first substrate construct a color filter substrate, wherein the color filter is formed on a bottom surface of the first substrate and faces to the second substrate.

In one embodiment of the present invention, the second substrate is a thin-film-transistor substrate, the liquid crystal panel has a color filter, and the color filter is formed on the thin-film-transistor substrate.

In one embodiment of the present invention, the color filter includes the edge black matrix and further includes a display-area black matrix; the display-area black matrix is disposed in the display area and integrally connected to the edge black matrix.

In one embodiment of the present invention, the display-area black matrix is connected to the edge black matrix along an extension direction, and the photo spacers are extended to the edge light-shielding area along the extension direction of the display-area black matrix relative to the edge black matrix.

In one embodiment of the present invention, each of the photo spacers has an outer end which maintains a distance to the sealing member.

In one embodiment of the present invention, each of the photo spacers is in a strip shape.

In one embodiment of the present invention, each of the photo spacers has a plurality of longer sections and a plurality of shorter sections, and the longer sections and the shorter sections are arranged alternately at intervals in a strip shape.

In one embodiment of the present invention, each of the photo spacers has a plurality of sections with identical length, wherein the sections are arranged at intervals in a strip shape.

In one embodiment of the present invention, each of the photo spacers has a length disposed in the display area that is smaller than or equal to 30 mm, and has another length disposed in the edge light-shielding area that is smaller than or equal to 20 mm.

Comparing with the conventional technology, the liquid crystal panel and the color filter substrate use the shapes and the arrangement of photo spacers to form a plurality of slits at the edge of a display area to help the liquid crystal material to diffuse and flow by capillarity for reducing the risk that the liquid crystal material forms bubbles at the edges of the display area, so as to increase the production yield.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
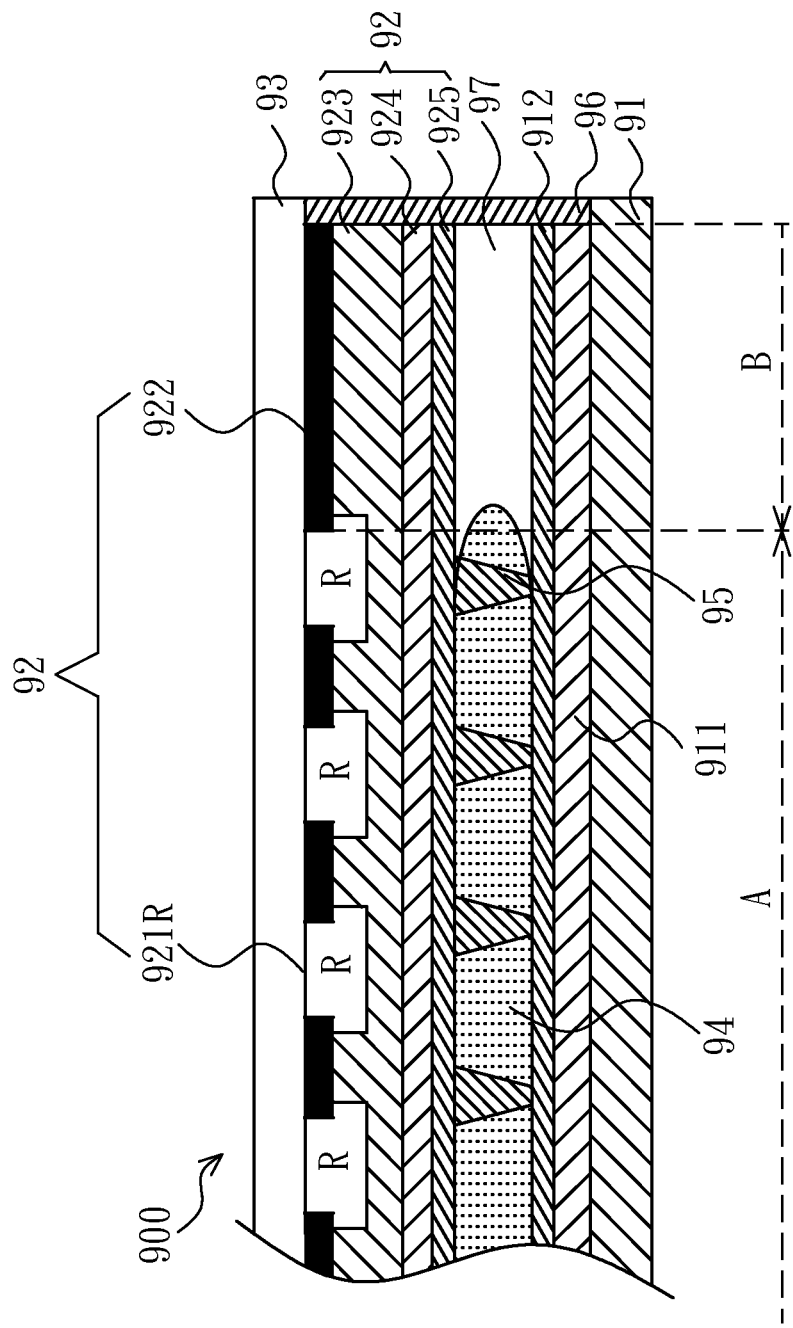
FIG. 1 is a partially cross-sectional side view of a conventional liquid crystal panel.
Figure 2:
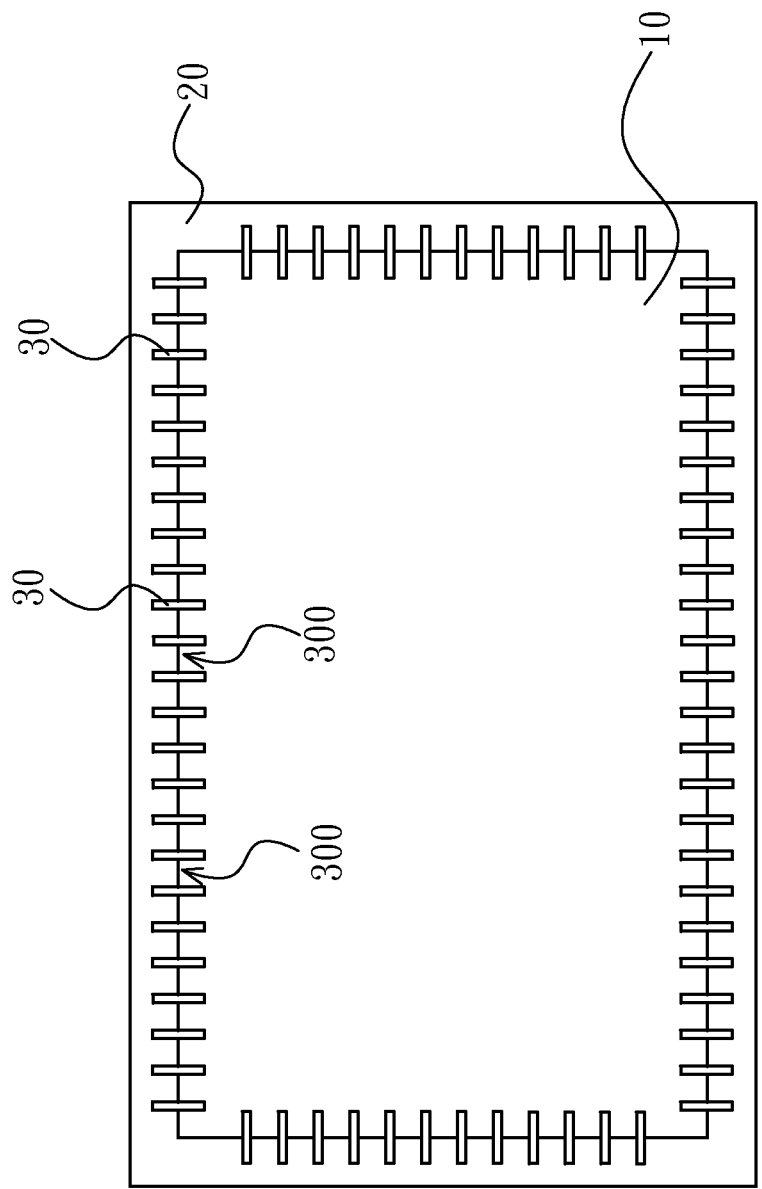
FIG. 2 is a schematic top view of a liquid crystal panel according to a first embodiment of the present invention.
Figure 3:
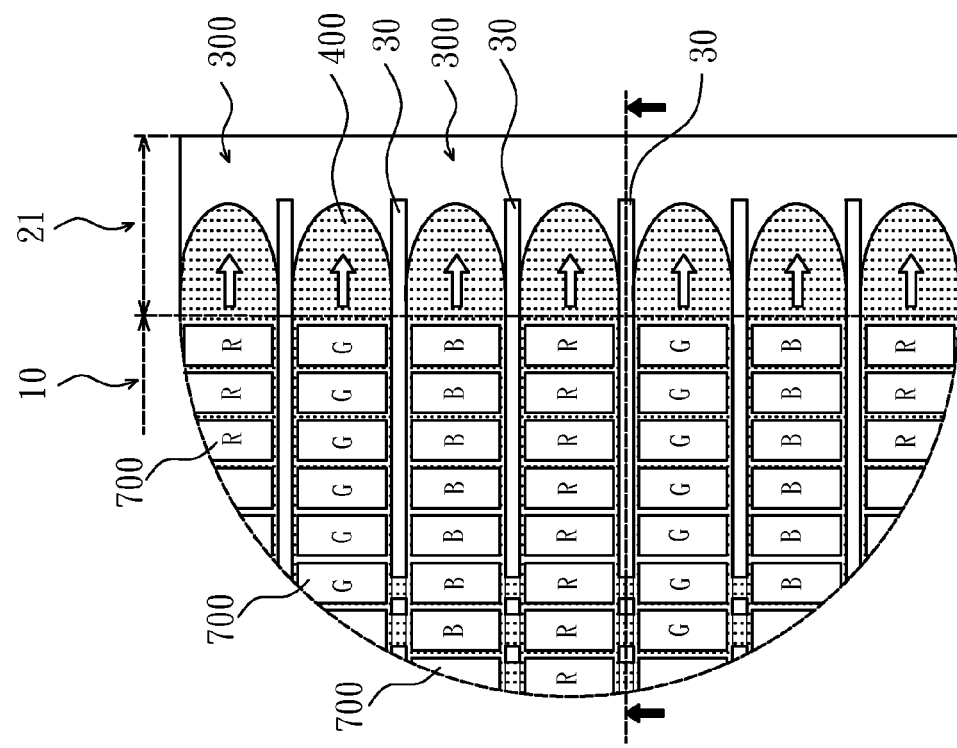
FIG. 3 is a partially enlarged schematic view of FIG. 2.
Figure 4:
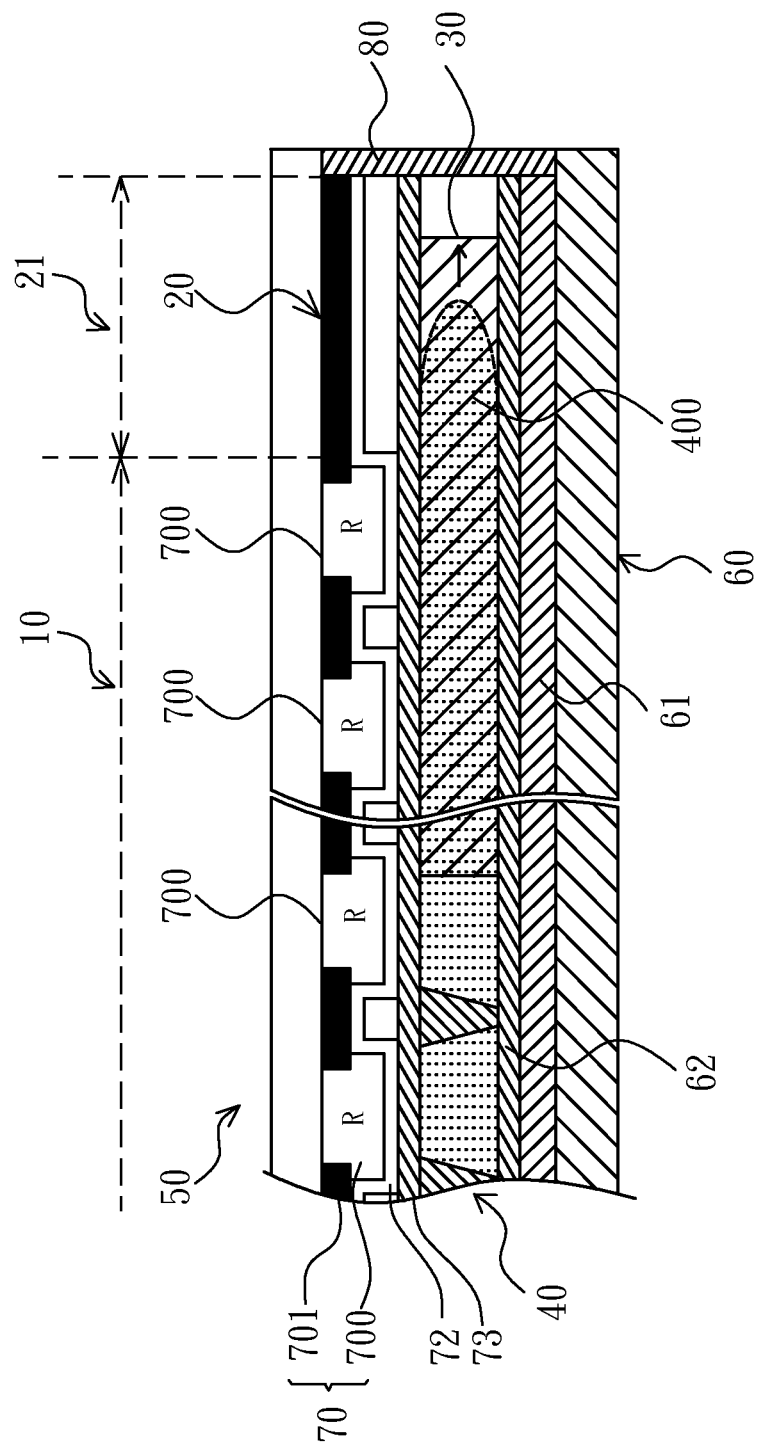
FIG. 4 is a partially cross-sectional side view of a liquid crystal panel according to the first embodiment of the present invention.

With reference to FIGS. 2, 3 and 4, FIG. 2 is a schematic top view of a liquid crystal panel according to a first embodiment of the present invention; FIG. 3 is a partially enlarged schematic view of FIG. 2; FIG. 4 is a partially cross-sectional side view of the liquid crystal panel according to the first embodiment of the present invention. The liquid crystal panel has a display area 10, an edge black matrix 20, a plurality of photo spacers 30 and a liquid crystal layer 40.

With further reference to FIG. 3, the display area 10 has a plurality of color filtering units 700 arranged in a matrix arrangement.

The edge black matrix 20 surrounds the display area 10 and forms an edge light-shielding area 21 corresponding to a periphery of the display area 10.

The photo spacers 30 are arranged on the periphery of the display area 10, and extends into the edge light-shielding 21 area formed by the edge black matrix 20. Each of the photo spacers 30 is separated from the adjacent photo spacer 30 at a distance to form a slit 300 therebetween, and thereby the arrangement of the photo spacers 30 forms a plurality of slits 300 surrounding the display area 10. In the embodiment, each of the photo spacers 30 is in a strip shape. Furthermore, each of the photo spacers 30 has a length disposed in the display area that is preferably smaller than or equal to 30 mm, and has another length disposed in the edge light-shielding area that is preferably smaller than or equal to 20 mm.

With reference to FIGS. 3 and 4, the liquid crystal layer 40 has liquid crystal material 400 and is disposed in a range of the display area 10. The slits 30 formed by the photo spacers 30 help the liquid crystal material 400 to diffuse and flow towards the edge light-shielding area 21 formed by the edge black matrix 20 by capillarity, so as to effectively prevent the liquid crystal material 400 from forming bubbles at the periphery of the display area 10 due to insufficient diffusion, or to reduce size of the bubbles as possible, so that the bubbles will at least not expand into the display area 10.

Figure 5:
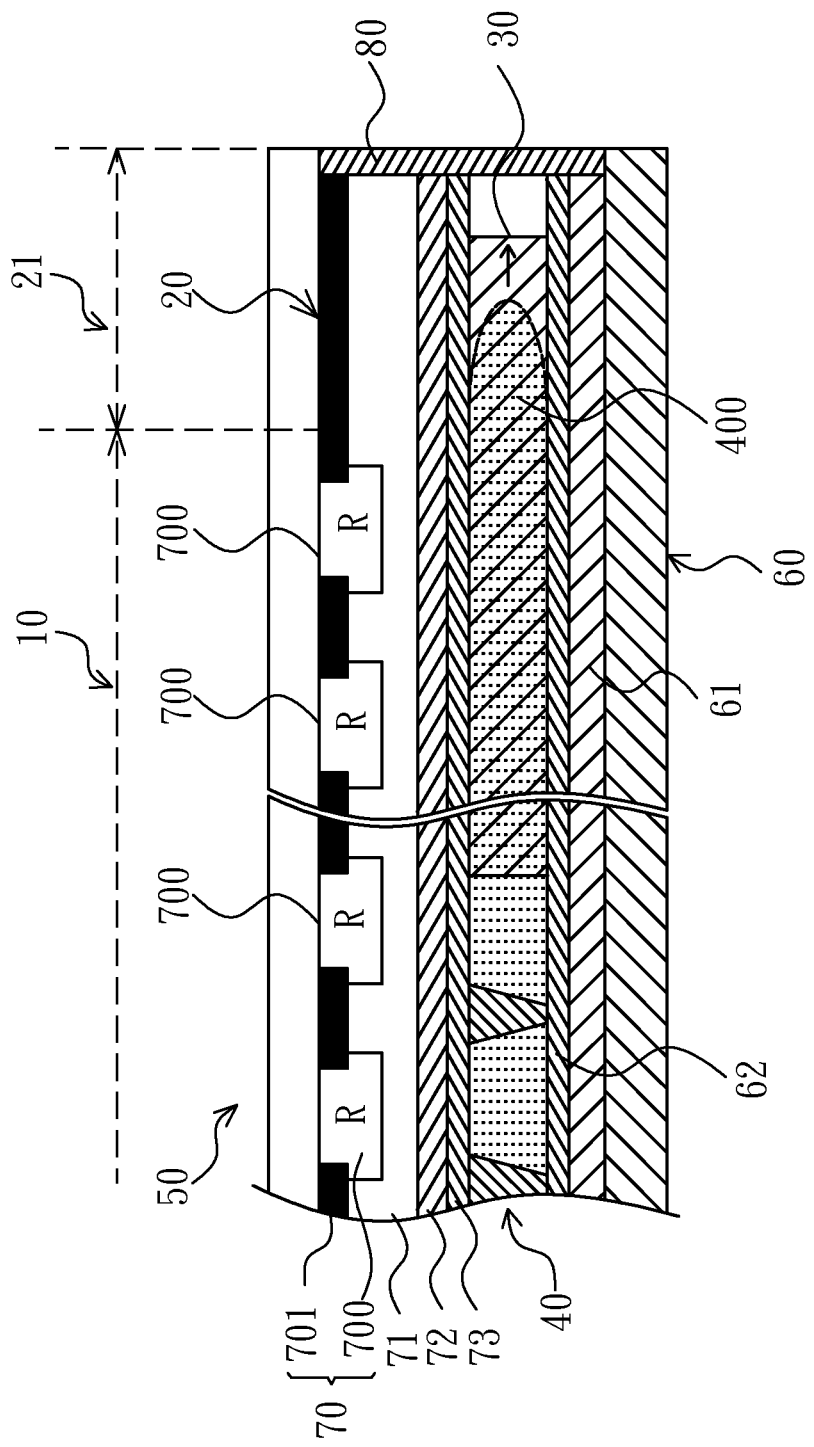
FIG. 5 is a partially cross-sectional side view of a liquid crystal panel according to a second embodiment of the present invention.

With reference to FIG. 4, in this embodiment, the liquid crystal panel may be a thin-film-transistor liquid crystal display and has a first substrate 50, a second substrate 60, a transparent conductive layer 72, an alignment film 73, a color filter 70 and a sealing member 80; wherein the second substrate 60 and the first substrate 50 are disposed opposite to each other and stacked with the display area 10. And the second substrate 60 may be a thin-film-transistor substrate having a pixel electrode layer 61 and an alignment film 62. The sealing member 80 surrounds the display area 10 and bonds the first substrate 50 and the second substrate 60. In this embodiment, the color filter 70 and the first substrate 50 construct a color filter substrate, wherein the color filter is formed on a bottom surface of the first substrate 50 and faces to the second substrate 60. (Alternatively, the color filter 70 may be directly formed on the thin-film-transistor substrate by a color-filter-on-array technology (COA).) The color filter 70 may include a plurality of color filtering units 700, a display-area black matrix 701 and the edge black matrix 20, wherein the color filtering units 700, the display-area black matrix 701, the edge black matrix 20, the transparent conductive layer 72 and the alignment film 73 are formed on the first substrate 50 in turn. With further reference to FIG. 5, the color filter 70 may further include a protecting layer 71, and the protecting layer 71 is formed on and covers the color filtering units 700, the display-area black matrix 701 and the edge black matrix 20, so as to even the transparent conductive layer 72. The liquid crystal layer 40 is disposed between the first substrate 50, the second substrate 60 and the sealing member 80. The photo spacers 30 are also disposed between the first substrate 50 and the second substrate 60, and may be formed on the conductive layer 72. The display-area black matrix 701 is arranged in the range of the display area 10 and integrally connected to the edge black matrix 20, both of which basically belong to an identical black matrix that differ in positions. The display-area black matrix 701 is usually a matrix-type grid structure which may be connected to the edge black matrix 20 along a horizontal or a vertical extension direction.

Figure 6:
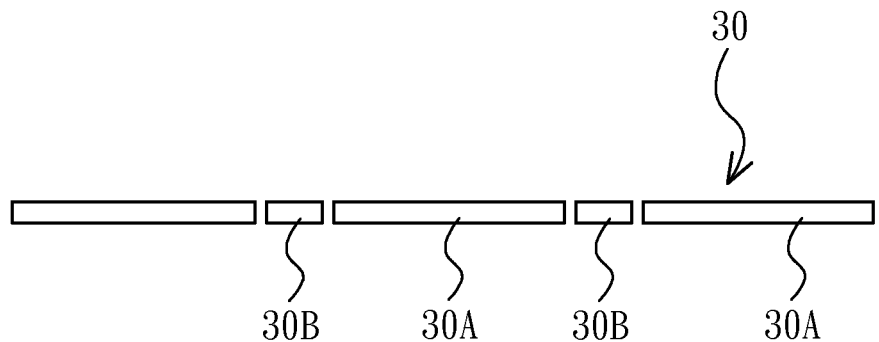
FIG. 6 is a schematic top view of photo spacers of the liquid crystal panel of a second embodiment in accordance with the present invention.

The shape of the photo spacers 30 is not limited to the strip shape of the sequential lines shown in FIG. 3. For example, with reference to FIG. 6, FIG. 6 is a schematic view of a second embodiment of the photo spacers 30, wherein the difference to the first embodiment is that: each of the photo spacers 30 has a plurality of longer sections 30A and a plurality of shorter sections 30B, and the longer sections 30A and the shorter sections 30B are arranged alternately at intervals in a strip shape.

Figure 7:
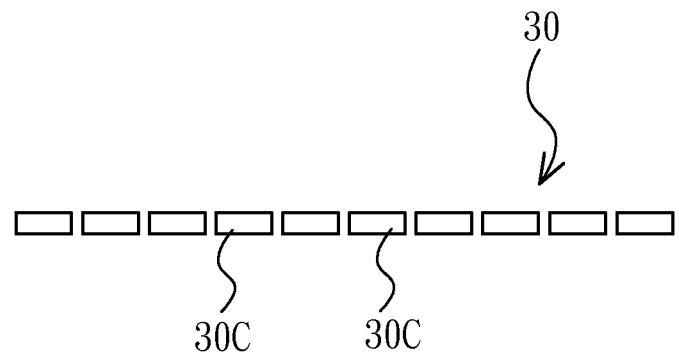
FIG. 7 is a schematic top view of photo spacers of the liquid crystal panel of a third embodiment in accordance with the present invention.

With reference to FIG. 7, FIG. 7 is a schematic view of a third embodiment of the photo spacers 30, wherein the difference to the first and the second embodiments is that: each of the photo spacers 30 has a plurality of sections 30C with identical length, wherein the sections 30C are discontinuously arranged at identical intervals in a strip shape.

In conclusion, the liquid crystal panel of the present invention mainly arranges the photo spacers 30 on the periphery of the display area 10 that each of the photo spacers 30 is extended into the edge light-shielding area 21 formed by the edge black matrix 20 surrounding the display area 10. The photo spacers 30 are all extended to the edge light-shielding area 21 along an extension direction of the display-area black matrix 701 relative to the edge black matrix 20. Each of the photo spacers 30 is separated from the adjacent photo spacer 30 at a distance to form the slit 300 therebetween, so that the slit 300 helps the liquid crystal material 400 in the display area 10 to diffuse and flow towards the edge light-shielding area 21 by capillarity, and thereby prevents production of liquid crystal bubbles and prevents the liquid crystal panel from being scrapped due to the production of the liquid crystal bubbles, and therefore relatively enhance the production yield of the liquid crystal panel. Furthermore, an outer end of each of the photo spacers 30 is preferably maintained at a predetermined distance to the sealing member 80, in other words, the outer ends of the photo spacers 30 preferably do not contact with the sealing member, so that two of the adjacent slits 300 is able to communicate with each other to promote capillarity for diffusing and flowing of the liquid crystal material 400.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A color filter substrate, characterized in that: comprising a substrate, a plurality of color filtering units, a display-area black matrix, an edge black matrix, wherein the color filtering units, the display-area black matrix, the edge black matrix and a transparent conductive layer are formed on the substrate in turn; the display-area black matrix is connected to the edge black matrix along an extension direction; the edge black matrix surrounds a display area of a liquid crystal panel and then forms an edge light-shielding area corresponding to a periphery of the display area, wherein the color filter substrate further has a plurality of photo spacers formed on the transparent conductive layer, arranged on the periphery of the display area, and are extended into the edge light-shielding area formed by the edge black matrix along the extension direction of the display-area black matrix relative to the edge black matrix; each of the photo spacers has a length disposed in the display area that is smaller than or equal to 30 mm, and has another length disposed in the edge light-shielding area that is smaller than or equal to 20 mm; and each of the photo spacers is separated from the adjacent photo spacer at a distance to form a slit therebetween, liquid crystal material in the display area flows through the slit to the edge light-shielding area by capillarity.

2. A color filter substrate, characterized in that: comprising a substrate, a plurality of color filtering units, a display-area black matrix, an edge black matrix, wherein the color filtering units, the display-area black matrix, the edge black matrix and a transparent conductive layer are formed on the substrate in turn; the edge black matrix surrounds a display area of a liquid crystal panel and then forms an edge light-shielding area corresponding to a periphery of the display area, wherein the color filter substrate further has a plurality of photo spacers formed on the transparent conductive layer, arranged on the periphery of the display area, and are extended into the edge light-shielding area formed by the edge black matrix; and each of the photo spacers has a length disposed in the display area and another length disposed in the edge light-shielding area and is separated from the adjacent photo spacer at a distance to form a slit therebetween, liquid crystal material in the display area flows through the slit to the edge light-shielding area by capillarity.

3. The color filter substrate as claimed in claim 2, characterized in that: the display-area black matrix is connected to the edge black matrix along an extension direction, and the photo spacers are extended to the edge light-shielding area along the extension direction of the display-area black matrix relative to the edge black matrix.

4. The color filter substrate as claimed in claim 2, characterized in that: each of the photo spacers is in a strip shape.

5. The color filter substrate as claimed in claim 2, characterized in that: each of the photo spacers has a plurality of longer sections and a plurality of shorter sections, and the longer sections and the shorter sections are arranged alternately at intervals in a strip shape.

6. The color filter substrate as claimed in claim 2, characterized in that: each of the photo spacers has a plurality of sections with identical length, wherein the sections are arranged at intervals in a strip shape.

7. The color filter substrate as claimed in claim 2, characterized in that: each of the photo spacers has a length disposed in the display area that is smaller than or equal to 30 mm, and has another length disposed in the edge light-shielding area that is smaller than or equal to 20 mm.

8. A liquid crystal panel, characterized in that: the liquid crystal panel comprises:
a display area;
a liquid crystal layer having liquid crystal material and disposed in a range of the display area;
an edge black matrix surrounding the display area and forming an edge light-shielding area corresponding to a periphery of the display area; and
a plurality of photo spacers disposed on the periphery of the display area and extended to the edge light-shielding area which is formed on the periphery of the display area by the edge black matrix, wherein each of the photo spacers has a length disposed in the display area and another length disposed in the edge light-shielding area and is separated from the adjacent photo spacer at a distance to form a slit therebetween, and the liquid crystal material of the liquid crystal layer flows through the slit to the edge light-shielding area by capillarity.

9. The liquid crystal panel as claimed in claim 8, characterized in that: the liquid crystal panel has a first substrate, a second substrate and a sealing member; the second substrate and the first substrate are disposed opposite to each other; the sealing member surrounds the display area and bonds the first substrate and the second substrate; the liquid crystal layer is disposed between the first substrate, the second substrate and the sealing member; the photo spacers are disposed between the first substrate and the second substrate.

10. The liquid crystal panel as claimed in claim 9, characterized in that: the second substrate is a thin-film-transistor substrate; the liquid crystal panel has a color filter, the color filter and the first substrate construct a color filter substrate, wherein the color filter is formed on a bottom surface of the first substrate and faces to the second substrate.

11. The liquid crystal panel as claimed in claim 10, characterized in that: the color filter includes the edge black matrix and further includes a display-area black matrix; the display-area black matrix is disposed in the display area and integrally connected to the edge black matrix.

12. The liquid crystal panel as claimed in claim 11, characterized in that: the display-area black matrix is connected to the edge black matrix along an extension direction, and the photo spacers are extended to the edge light-shielding area along the extension direction of the display-area black matrix relative to the edge black matrix.

13. The liquid crystal panel as claimed in claim 9, characterized in that: the second substrate is a thin-film-transistor substrate, the liquid crystal panel has a color filter, and the color filter is formed on the thin-film-transistor substrate.

14. The liquid crystal panel as claimed in claim 13, characterized in that: the color filter includes the edge black matrix and further includes a display-area black matrix; and the display-area black matrix is disposed in the display area and integrally connected to the edge black matrix.

15. The liquid crystal panel as claimed in claim 14, characterized in that: the display-area black matrix is connected to the edge black matrix along an extension direction, and the photo spacers are extended to the edge light-shielding area along the extension direction of the display-area black matrix relative to the edge black matrix.

16. The liquid crystal panel as claimed in claim 9, characterized in that: each of the photo spacers has an outer end which maintains a distance to the sealing member.

17. The liquid crystal panel as claimed in claim 8, characterized in that: each of the photo spacers is in a strip shape.

18. The liquid crystal panel as claimed in claim 8, characterized in that: each of the photo spacers has a plurality of longer sections and a plurality of shorter sections, and the longer sections and the shorter sections are arranged alternately at intervals in a strip shape.

19. The liquid crystal panel as claimed in claim 8, characterized in that: each of the photo spacers has a plurality of sections with identical length, wherein the sections are arranged at intervals in a strip shape.

20. The liquid crystal panel as claimed in claim 8, characterized in that: each of the photo spacers has a length disposed in the display area that is smaller than or equal to 30 mm, and has another length disposed in the edge light-shielding area that is smaller than or equal to 20 mm.

* * * * *